US012315478B2

(12) United States Patent
Walker

(10) Patent No.: US 12,315,478 B2
(45) Date of Patent: May 27, 2025

(54) VIBRATO CONTROL MECHANISM

(71) Applicant: TECHNOLOGY CONNECTIONS INTERNATIONAL PTY LTD, North Ryde (AU)

(72) Inventor: Peter Walker, North Ryde (AU)

(73) Assignee: TECHNOLOGY CONNECTIONS INTERNATIONAL PTY LTD, New South Wales (AU)

( * ) Notice: Subject to any disclaimer, the term of this patent is extended or adjusted under 35 U.S.C. 154(b) by 218 days.

(21) Appl. No.: 17/626,427

(22) PCT Filed: Jul. 13, 2020

(86) PCT No.: PCT/AU2020/050723
§ 371 (c)(1),
(2) Date: Jan. 11, 2022

(87) PCT Pub. No.: WO2021/007614
PCT Pub. Date: Jan. 21, 2021

(65) Prior Publication Data

US 2022/0293071 A1 Sep. 15, 2022

(30) Foreign Application Priority Data

Jul. 12, 2019 (AU) ................................ 2019902479

(51) Int. Cl.
*G10D 3/147* (2020.01)

(52) U.S. Cl.
CPC ....... *G10D 3/147* (2020.02); *G10H 2210/211* (2013.01)

(58) Field of Classification Search
CPC ........ G10D 3/147; G10D 1/085; G10D 3/153; G10H 2210/211; G10H 1/32; G10H 2220/521; G10H 1/0555; G10H 1/0535; G10H 2210/215
See application file for complete search history.

(56) References Cited

U.S. PATENT DOCUMENTS

| | | | | |
|---|---|---|---|---|
| 3,457,821 A * | 7/1969 | Huis | ...................... | G10D 3/153 D17/21 |
| 5,024,134 A | 6/1991 | Uchiyama | | |
| 2012/0318117 A1* | 12/2012 | Deck | ...................... | G10D 3/153 84/313 |
| 2017/0301323 A1 | 10/2017 | Cardozo | | |
| 2018/0247618 A1 | 8/2018 | Walker | | |

FOREIGN PATENT DOCUMENTS

| | | | |
|---|---|---|---|
| JP | H05134657 A * | 5/1993 | ............... G10D 3/00 |

OTHER PUBLICATIONS

International Search Report mailed on Oct. 6, 2020, in International Application No. PCT/AU2020/050723. (5 pages).
Written Opinion of the International Searching Authority mailed on Oct. 6, 2020, in International Application No. PCT/AU2020/050723. (5 pages).

* cited by examiner

*Primary Examiner* — Kimberly R Lockett

(57) ABSTRACT

A vibrato control device for a guitar, including a body, a rotation mechanism within the body having an axis, and an arm connected to the body so as to allow rotation of the arm relative to the body about the axis. The arm is oriented so as to rotate generally parallel to the side of the body. The arm has particular application to a mechanically operated but electronically sensed vibrato control device.

8 Claims, 7 Drawing Sheets

VIBRATO CONTROL MECHANISM

CROSS-REFERENCE TO RELATED APPLICATIONS

This application is a § 371 national phase entry of International Application No. PCT/AU2020/050723, filed Jul. 13, 2020, which claims priority to Australian Patent Application No. 2019902479, filed Jul. 12, 2019, the entireties of which are incorporated herein by reference.

TECHNICAL FIELD

The present invention relates to vibrato mechanisms for use on guitars and other stringed instruments, and to musical instrument including such devices.

BACKGROUND OF THE INVENTION

Guitars have been an important musical instrument in popular Western music for over 70 years. The electric guitar has been widely used, modified, and the outputs signals subjected to a wide variety of electronic modification. For example, many of the distinctive effects of electric guitar players are the result of the use of specially designed pedals and other modification devices. These, coupled with the skill and ability of the artist, allow for an enormous range of effects, sounds and playing styles.

Another aspect of the performance dynamic of many guitar players is the use of the whammy bar, or vibrato arm. This allows for the pitch of a note to be varied about the regular value of the note. The term is widely used in string instruments, for example in relation to violins, and in relation to the human voice. It is noted that this component is in many cases in the guitar context referred to in error as a tremolo arm, tremolo being in fact the variation of amplitude rather than pitch or frequency. The present invention is concerned with the provision of a vibrato device for guitars and other musical instruments.

Vibrato devices for electric guitars have been known since the 1930s, and came in to widespread use through the 1950s and 1960s. The existing vibrato arms in use are all mechanical in nature. In essence, they alter the pitch of the strings using a mechanical system to decrease or increase the tension of the strings, with a corresponding decrease or increase in pitch. Changing the pitch in this way has a number of inherent drawbacks, for example that any or all of the strings may not return to exactly the correct pitch when the vibrato arm is released.

Various attempts to resolve these problems mechanically have been proposed, for example as outlined at http://en.wikipedia.org/wiki/Vibrato systems for guitar. These include the floating bridge (Stratocaster®), rotating string guides (Bigsby), Locked strings (Floyd Rose), multi-leveraged systems (Wilkinson et al).

Whilst providing improvements in some respects over the prior art systems, all such systems suffer from the need to impose complex mechanical systems simply in order to compensate for the deficiencies in a mechanical approach to vibrato.

The present applicant has proposed, in WO2016149747, a solution in which a mechanical vibrato arm is combined with electronic sensors and an electronic pitch change mechanism to provide a vibrato effect without altering the string tension or tuning. This disclosure uses a vibrato arm of generally conventional shape and configuration. The disclosure of this application is hereby incorporated by reference.

It is an object of the present invention to provide an alternative vibrato device which is capable of precise, repeatable and convenient operation by a player.

SUMMARY OF THE INVENTION

In a first broad form, the present invention provides a vibrato control mechanism in which the operation arm is oriented generally parallel to its axis of rotation.

According to one aspect, the present invention provides a vibrato control device for a guitar, including a body, a rotation mechanism within the body having an axis, and an arm connected to the body so as to allow rotation of the arm relative to the body about the axis, wherein the arm is oriented so as to rotate generally parallel to the side of the body.

According to another aspect, the present invention provides a vibrato control device for a guitar, including a body, a rotation mechanism within the body having an axis, and a connection for an arm to be connected to the body so as to allow rotation of the arm relative to the body about the axis, wherein the connection is such that in one form an arm can be connected which arm is free to rotate at the connection, and in another form the arm can be connected so that it cannot rotate at the connection.

The present invention further encompasses a guitar with a vibrato control device as described above. In one form the vibrato control device is located immediately behind the bridge or stud tail piece of the guitar, and the axis of rotation of the arm is generally normal to the strings.

The invention accordingly provides a new form of vibrato control device, particularly for electronic pitch change systems, which provides improved convenience for the player.

BRIEF DESCRIPTION OF THE DRAWINGS

An illustrative implementation of the present invention will now be described with reference to the accompanying figures, in which.

DETAILED DESCRIPTION OF THE INVENTION

The present invention relates to a new geometry and arrangement for a vibrato arm, particularly one which operates mechanically to control vibrato (and optionally other features) to produce a control output for a pitch change processor and associated systems. It is capable of being implemented using any suitable mechanical system and electronic, sensor and software system, and is not specific to any particular implementation of such features. It will, however, be primarily described with reference to the system described in co-pending application WO2016149747, to which reference should be had for details of implementation.

Conventional whammy bars have a configuration with a relatively long lever, so that sufficient leverage can be obtained to overcome the string and spring tensions inherent in the mechanical design underlying prior art whammy bar systems. The inventor has recognised that in an arrangement in which the mechanical system is only required to sense electronic data for processing by a pitch change mechanism, there is an opportunity to provide a control arm which is more oriented to improving the playing convenience of the player.

The present invention departs from the long arm, which extends generally away from the surface of the guitar. In contrast, the implementation described extends generally parallel to the axis of rotation, and remains close to the surface of the guitar. As such, it can be positioned much more conveniently, for example directly behind the bridge (or stud tailpiece) of the guitar, which is impossible with a conventional arm because of the leverage required to overcome string/spring tension (~70-80 Kgs).

Figure 1:
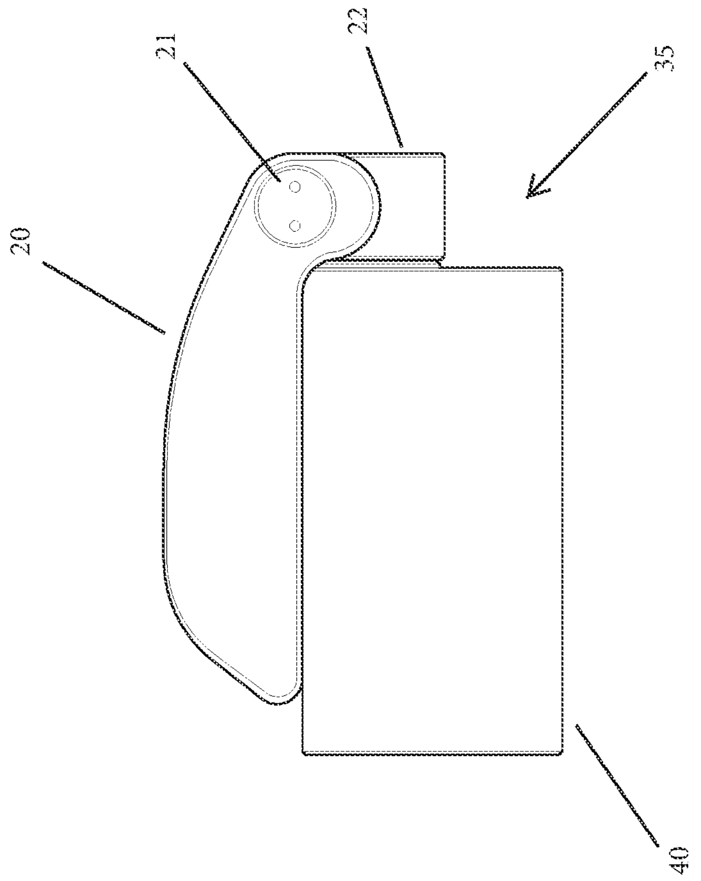
FIG. 1 is a front view of an illustrative device.

Referring to FIG. 1, the device 35 includes a body 40, boss 22 and attachment 21. These are as described in the applicant's co-pending case, referenced above. Arm 20 is mounted adjacent to body 40, and connects via attachment 21 to knuckle 22. Thus, arm 20 can rotate parallel to body 40, and parallel to the axis of rotation of knuckle 22.

It will be appreciated that it would be possible for the axis of rotation of the arm to be somewhat off parallel to the axis of rotation of the knuckle, and still achieve an effective operation, and for this purpose the term generally parallel will be employed. For example, if the axis of rotation of the arm is less than 10° off the axis, the desired operation and advantages of the present invention can still be achieved. It may be that other values are also possible for practical use. It is preferred that the axis of the knuckle is parallel or very close to parallel to the axis of rotation of the arm.

It will be understood that body 40 is shown as rounded and without surface features, but in alternative implementations other shapes or features could be present on body 40.

Figure 2:
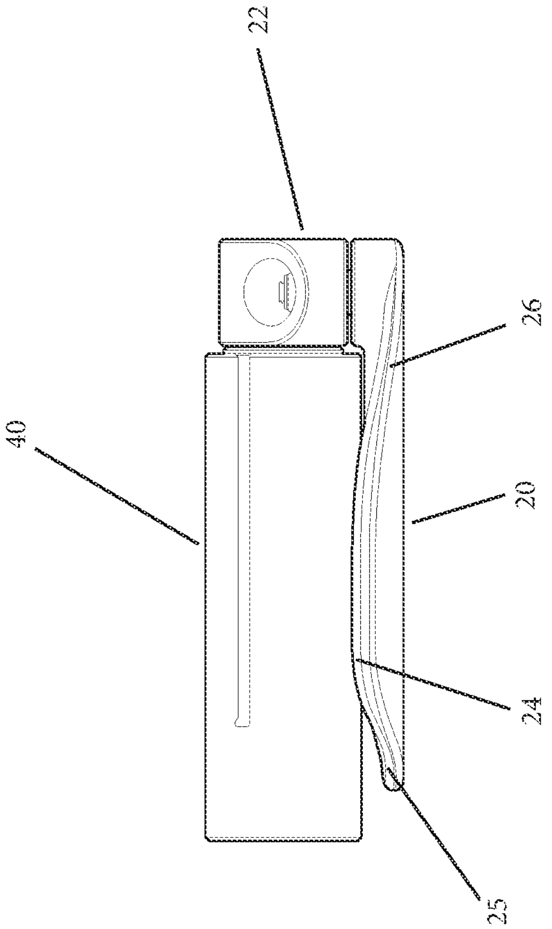
FIG. 2 is plan view of the illustrative device.

FIG. 2 shows a view in which the position of arm 20 relative to the body 40 can be understood. Arm 20 includes a variety of surface features intended to assist the player in easy and convenient operation. It will be understood that in alternative implementations, alternative or additional surface features may be present. These features are to provide ergonomic or tactile location for the player.

Palm cutaway 25 is provided so that arm 20 is out of the way when the palm of the player is resting on the top end of the bridge.

Palm push zone 24 is provided as a main push zone, for the palm of a player to push the arm down, typically to go down in pitch. As can be better seen in FIG. 4, on the underside a bevel 24A is provided so that it can be grabbed for moving the arm up, typically to go up in pitch.

Finger grab zone 26 is provided near to the attachment position, and provides a conveniently located surface for the third and fourth fingers to grab arm 20, in order to go up in pitch.

Figure 3:
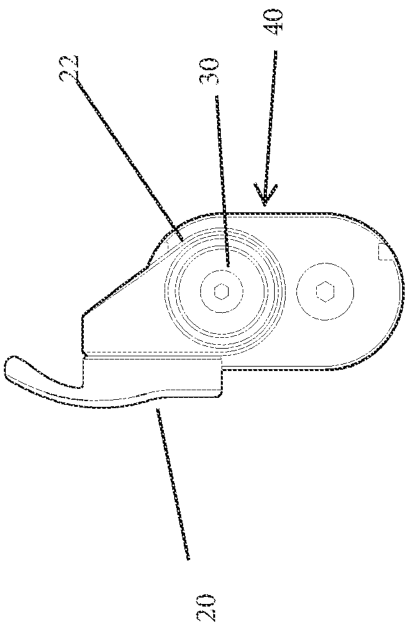
FIG. 3 is an end view of illustrative device.

FIG. 3 illustrates an end view, so that the knuckle 22 can be seen, with arm 20 resting alongside body 40. Attachment 30 affixes the centre of rotating knuckle 22 to the sensor spindle 5.

Figure 4:
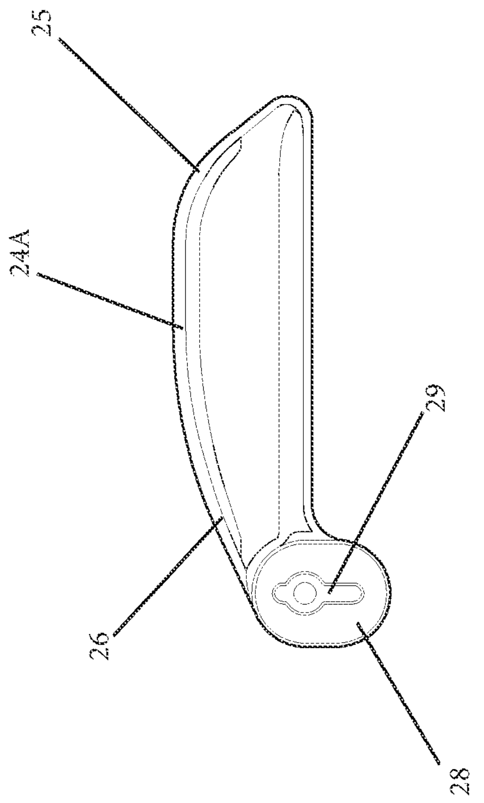
FIG. 4 is a view of the arm.

From FIG. 4 can be seen the arm 20 detached from the body 40. Arm 20 connects via plate 28, with raised boss 29 and a hole for affixing screw 21. Raised boss 29 mates with a slotted engagement on the knuckle 22; this engagement has a key-lock slot cut out (not shown) which mates with the raised boss 29 extending from plate 28. Thus, the arm maintains a fixed rotational relationship with the boss and cannot rotate relative to it.

A further aspect of the present invention is that the same body 40 may be used with a conventional whammy bar arm, as for example in the applicant's earlier referenced co-pending application. In this case the conventional arm attaches in the same way with a plate and screw, but there is no raised boss 29, so the keylock on the boss of knuckle 22 is not engaged, and the arm may rotate on knuckle 22.

Of course, alternative connection arrangements could be used for implementations of the present invention. For example, the arm could be made integral with the knuckle.

It will be understood that a particular advantage of some implementations of the present invention is that the player has full vibrato control without moving out of the small operating zone which a player's picking hand normally occupies. This means that the vibrato arm is readily available in the high-speed world of playing guitar, where milliseconds count.

The proximity and the ergonomic shape illustrated in the figures allow for ultra-rapid vibrato control, for example, 'ducks' and 'pull-ups' in pitch. These are much slower to perform with a prior art whammy arm which is further from the picking hand, which therefore requires a much larger hand movement to engage its arm, and also requires much greater force to manipulate.

The vibrato control device according to the present invention can be operated by any convenient action selected by the player, for example pressing down with fingers, palm, heel of the hand or forearm, pulling up with fingers or back of the palm, or holding and waggling with the hand. It will be appreciated that all functions of an existing, conventional whammy arm can be performed with the arm according to the present invention.

Figure 5:
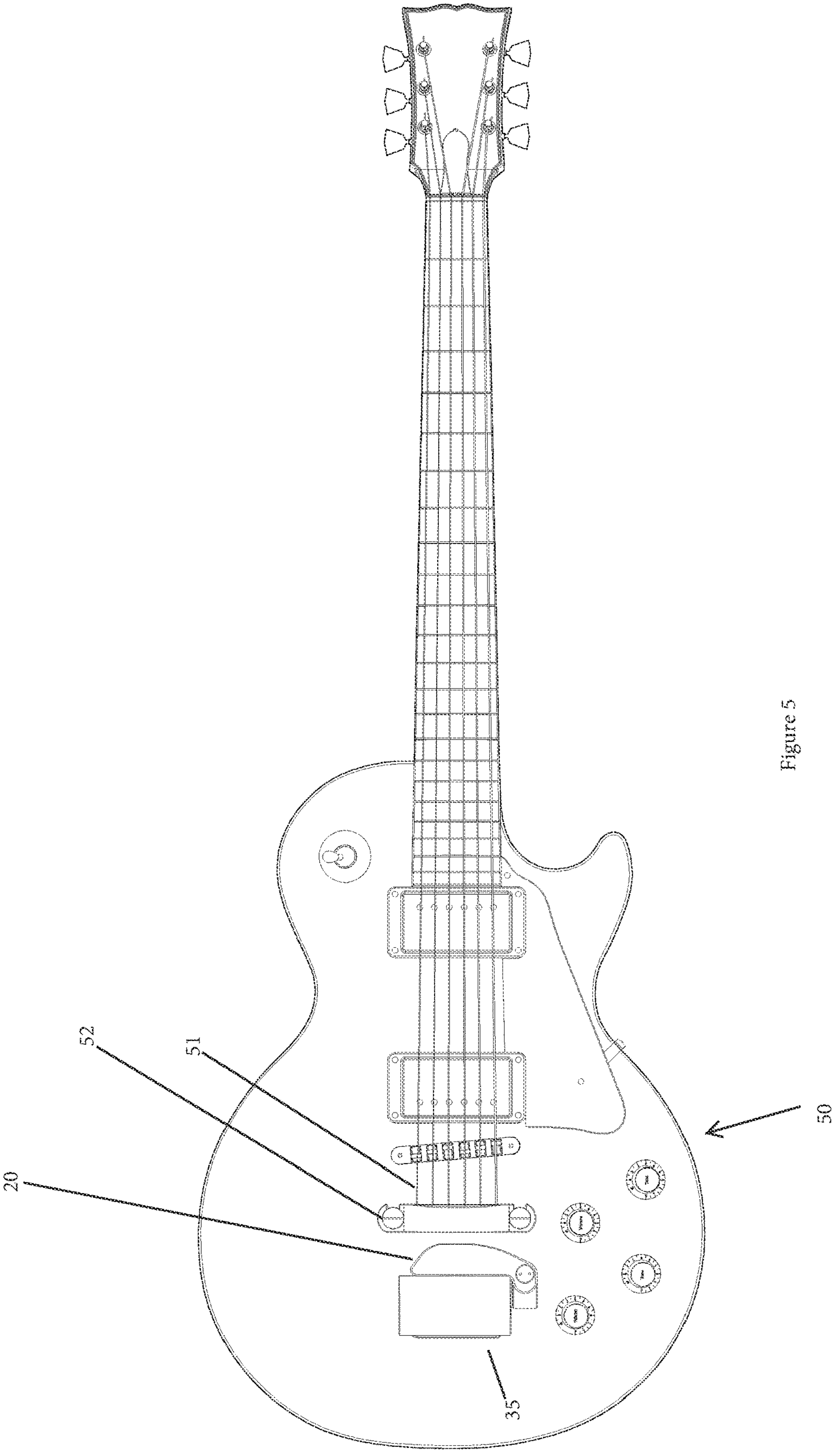
FIG. 5 is a view of a guitar with the vibrato device attached.

FIG. 5 illustrates a guitar 50 with a device 35 according to this embodiment of the present invention attached. The device 35 is attached immediately behind the bridge 52 of guitar 50, on the opposite side to the strings 51. The arm position is impossible for a conventional whammy bar.

The illustrative example is preferably implemented using the internal mechanisms of the device described in the applicant's earlier application, which has been incorporated by reference. For example, a mechanical return to centre mechanism, sensors for rotation and rotation direction, corresponding electronics and software, and a pitch change processor are required for a functioning system.

Figure 6:
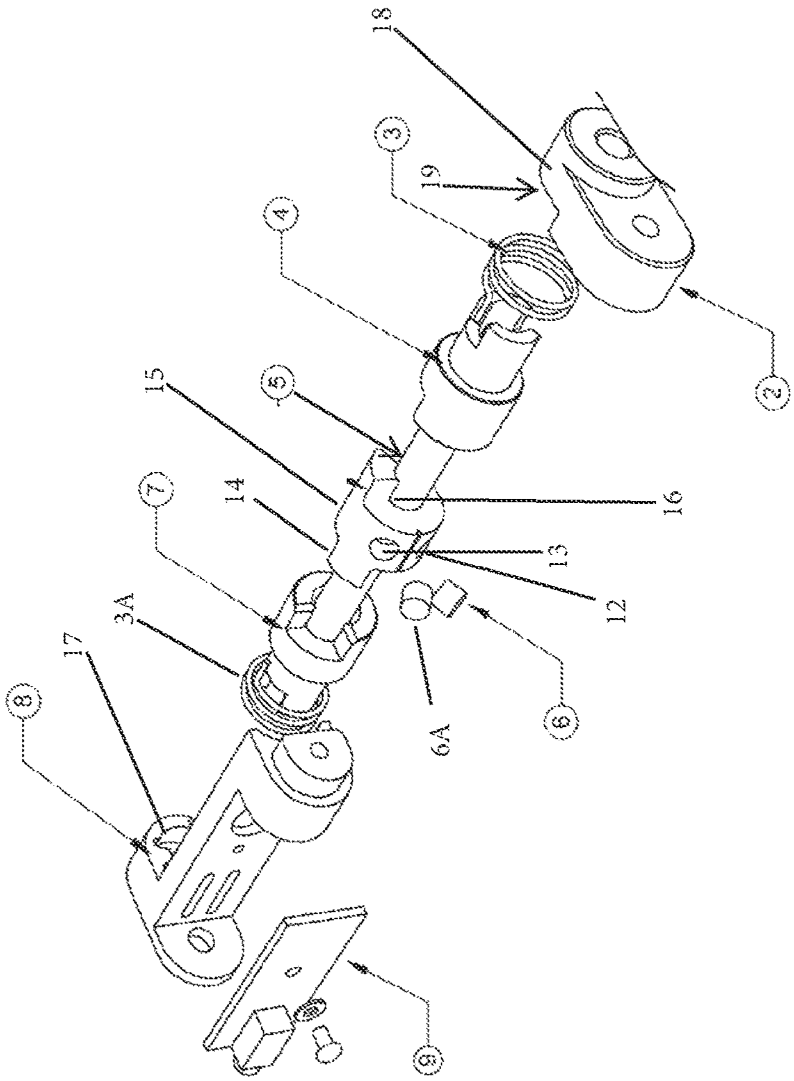
FIG. 6 illustrates in partly exploded view an implementation of a vibrato arm internal mechanism according to an implementation of the present invention.
Figure 7:
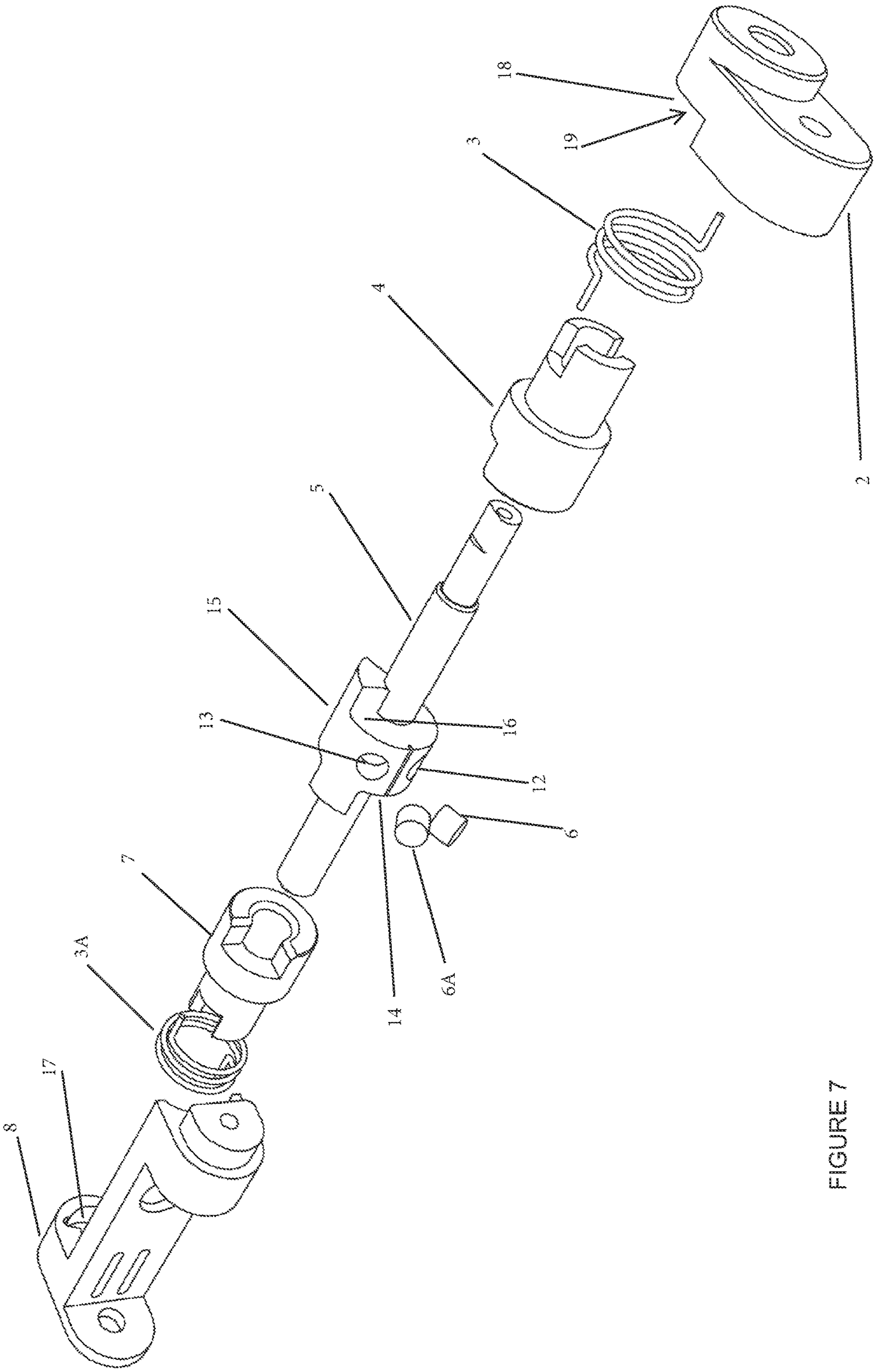
FIG. 7 shows a further exploded view of the arm of FIG. 6.

Referring to FIGS. 6 and 7, the vibrato device 10 includes a spindle 5 extending through the length of device 10. Spindle 5 has a generally cylindrical shape, forming a shaft, with an enlarged, generally raised section 15 (on both) disposed near the longitudinal centre. This includes angled cams 14,16 which will be described in more detail below. Raised section 15 also includes recesses 12, 13 for receiving magnets 6, 6A.

At each end of the spindle, collars 7, 4 are disposed. These are free to rotate about the spindle, but limited in their maximum rotation by respective end stops 17, 19 (indicated but not visible) in the housing 8 and end chassis 2 respectively. Each collar has an associated torsion spring 3, 3A. The springs are connected at one end to their respective collar 4, 7 and at the other to mounting recesses 8, 18. The springs and collars are connected so that they resiliently resist rotation. They are installed during manufacturing under a degree of tension even when the mechanism is in its centre position.

Arm 20 is attached to the end of spindle 5. Arm 20 includes a pivot 21 to allow the angle of the arm to be adjusted to suit the player.

When assembled, the whole mechanism sits largely within chassis 8, with chassis support 2 at the same end as arm 20. It can be seen that PCB 9 and the associated sensor (not visible) sit orthogonal to the magnets 6, 6A in the assembled state, magnet 6 being visible in FIG. 5. This facilitates the operation of the Hall Effect sensor, which is described in more detail in the aforementioned application, The key mechanical requirement is that the arm 20 can be rotated smoothly to the desired position, and return to centre (RTC) with high reliability and accuracy. The centre is the point where there is no requested pitch change, and the guitar operates normally. According to one or more embodiments, the vibrato device 10 is adapted to electronically capture data about the position of the arm 20 for transmission to an electronic device such as, for example, and electronic pitch control device.

The shaping of the cam surfaces 14, 16 on spindle 5 is an important component of the operation of the RTC mechanism. The collars 4, 7 are co-axial and can rotate freely, but in opposite directions, when forced by the rotation of the spindle, transmitted by the spindle cams 14, 16. This collar rotation is limited by end stops 17, 19. Collars meanwhile, are under tension from torsion springs 3, 3A. These springs have a three-fold function:

They provide resistance for the user to move the arm 'against', providing haptic feedback. They enforce an accurate centre position when the vibrato arm is at rest and they return the spindle to the neutral, zero-pitch-change position (with high accuracy and repeatability) when released.

The resistance function is accomplished because the springs resist the rotation of collars 4, 7. Each cam surface 14, 16 of the spindle is intimately contacting a surface of the corresponding collar 4, 7(whether rotating clockwise or anticlockwise). The spindle therefore receives the same (bi-directional) rotational resistance as the collars.

Further, the shape of the cams 14, 16 provides an obstruction to prevent the collars 4, 7 rotating further than their respective neutral position at rest, and further than their maximum rotation by end stops 17, 19 in use. Positioning of these mechanical 'end-stops' can be accurately defined in manufacture so that both collets return to an invariant position.

The net effect is that the spindle 5 always returns to a fixed, neutral position with high precision and repeatability. The RTC process is not tolerance bound. The springs do not have to be perfectly matched (which is near impossible without being very costly) as the RTC factor is not reliant on that aspect. The springs are preferably "over-specified" so that they still maintain adequate torsional strength as they age.

Further, the pre-loading of the springs can be set in manufacturing to ensure it will overcome most hysteresis in the friction components inherent in any mechanical RTC mechanism.

It will be appreciated that the present invention may be implemented using any suitable materials. In order to allow for the operation of the Hall effect sensor arrangement, it is preferred that the materials are non-magnetic.

Illustratively, the shaft/spindle structure, arm and case are formed from machined aluminium. The collars are machined nylon. The chassis is formed from machined nylon composite. All metal components may be suitably produced by CNC machining and the plastics via machining or moulding.

The express focus on the return-to-centre (RTC) mechanism of the vibrato system is to meet the requirement of very high accuracy (ideally +/−0.5 cents) because even small pitch errors are detectable at the centre (or 'null') position by listeners. Any tuning discrepancy is particularly evident relative to other instruments in the performance who are still at the correct reference pitch.

It will be understood that although a specific mechanical and sensing structure is disclosed above, the present invention may be implemented using alternative mechanical and sensing structure.

The invention claimed is:

1. A vibrato control device for a guitar, comprising a body, a rotation mechanism within the body having an axis, and an arm connected to the rotation mechanism, so that the arm can be rotated about the axis relative to the body, wherein the arm is oriented so as to be adapted to rotate generally parallel to a side of the body, the arm is adapted to rotate in both directions from a rest position, and the arm is shaped to provide surfaces for selective control by different parts of a player's hand, and wherein the rotation mechanism includes a biased return to centre.

2. A vibrato control device according to claim 1, wherein the arm includes a palm cutaway on the arm end distant from a connection to the body.

3. A vibrato control device according to claim 1, wherein the arm includes a palm zone shaped to permit pushing and lifting of the arm.

4. A vibrato control device according to claim 1, wherein the arm includes, a finger grab zone adjacent to a connection to the body.

5. A vibrato control device according to claim 2, wherein the arm includes a palm zone shaped to permit pushing and lifting of the arm.

6. A vibrato control device according to claim 5, wherein the arm includes a finger grab zone adjacent to a connection to the body.

7. A vibrato control device according to claim 2, wherein the arm includes a finger grab zone adjacent to a connection to the body.

8. A vibrato control device according to claim 3, wherein the arm includes a finger grab zone adjacent to a connection to the body.

* * * * *